United States Patent

Eck et al.

(10) Patent No.: US 7,621,199 B2
(45) Date of Patent: Nov. 24, 2009

(54) VEHICLE STEERING WHEEL

(75) Inventors: Gregor Eck, Kirchzell (DE); Jens Kayser, Eschau (DE)

(73) Assignee: TRW Automotive Safety Systems GmbH, Aschaffenburg (DE)

(*) Notice: Subject to any disclaimer, the term of this patent is extended or adjusted under 35 U.S.C. 154(b) by 358 days.

(21) Appl. No.: 11/045,415

(22) Filed: Jan. 28, 2005

(65) Prior Publication Data

US 2005/0160874 A1 Jul. 28, 2005

(30) Foreign Application Priority Data

Jan. 28, 2004 (DE) .................. 20 2004 001 255 U

(51) Int. Cl.
*B62D 1/04* (2006.01)

(52) U.S. Cl. ...................................... 74/552

(58) Field of Classification Search ................ 74/552
See application file for complete search history.

(56) References Cited

U.S. PATENT DOCUMENTS

| | | | | | |
|---|---|---|---|---|---|
| 1,280,724 | A | * | 10/1918 | Harroun | 74/552 |
| 1,363,118 | A | * | 12/1920 | Howell | 384/461 |
| 1,468,093 | A | * | 9/1923 | Weaver | 74/552 |
| 1,481,530 | A | * | 1/1924 | Beck | 74/552 |
| 1,858,650 | A | * | 5/1932 | Weida | 74/552 |
| 1,870,986 | A | * | 8/1932 | Cobb | 74/552 |
| 1,959,683 | A | * | 5/1934 | Mitchell | 74/552 |
| 2,041,739 | A | * | 5/1936 | Beck | 74/552 |
| 2,081,729 | A | * | 5/1937 | Beck | 74/552 |
| 4,061,054 | A | | 12/1977 | Wenninger | |
| 5,291,800 | A | * | 3/1994 | Patzelt et al. | 74/552 |
| 5,868,041 | A | * | 2/1999 | Suzuki | 74/552 |
| 5,896,661 | A | * | 4/1999 | Worrell et al. | 29/894.1 |
| 6,298,750 | B1 | * | 10/2001 | Kerner et al. | 74/552 |
| 6,367,351 | B2 | * | 4/2002 | Hosoi et al. | 74/552 |
| 6,595,083 | B2 | * | 7/2003 | Hosoi et al. | 74/522 |
| 2002/0100342 | A1 | * | 8/2002 | Drefahl et al. | 74/552 |

FOREIGN PATENT DOCUMENTS

| | | |
|---|---|---|
| DE | 2530594 | 1/1977 |
| DE | 3147517 | 7/1982 |
| DE | 3426684 | 1/1985 |
| EP | 1228940 | 8/2002 |
| JP | 6285607 | 10/1994 |

* cited by examiner

*Primary Examiner*—Vicky A Johnson
(74) *Attorney, Agent, or Firm*—Tarolli, Sundheim, Covell & Tummino LLP

(57) ABSTRACT

A vehicle steering wheel comprises a steering wheel skeleton having a hub section, which has a bush extending around a central insertion opening and at least one separate reinforcement plate connected with the bush which is embedded into a die cast section of the steering wheel skeleton. The bush has a groove directed radially outwards, into which an edge of a recess in the reinforcement plate projects. The reinforcement plate is arranged on the bush through a joint connection by material conjunction.

7 Claims, 2 Drawing Sheets

VEHICLE STEERING WHEEL

TECHNICAL FIELD

Figure 1:
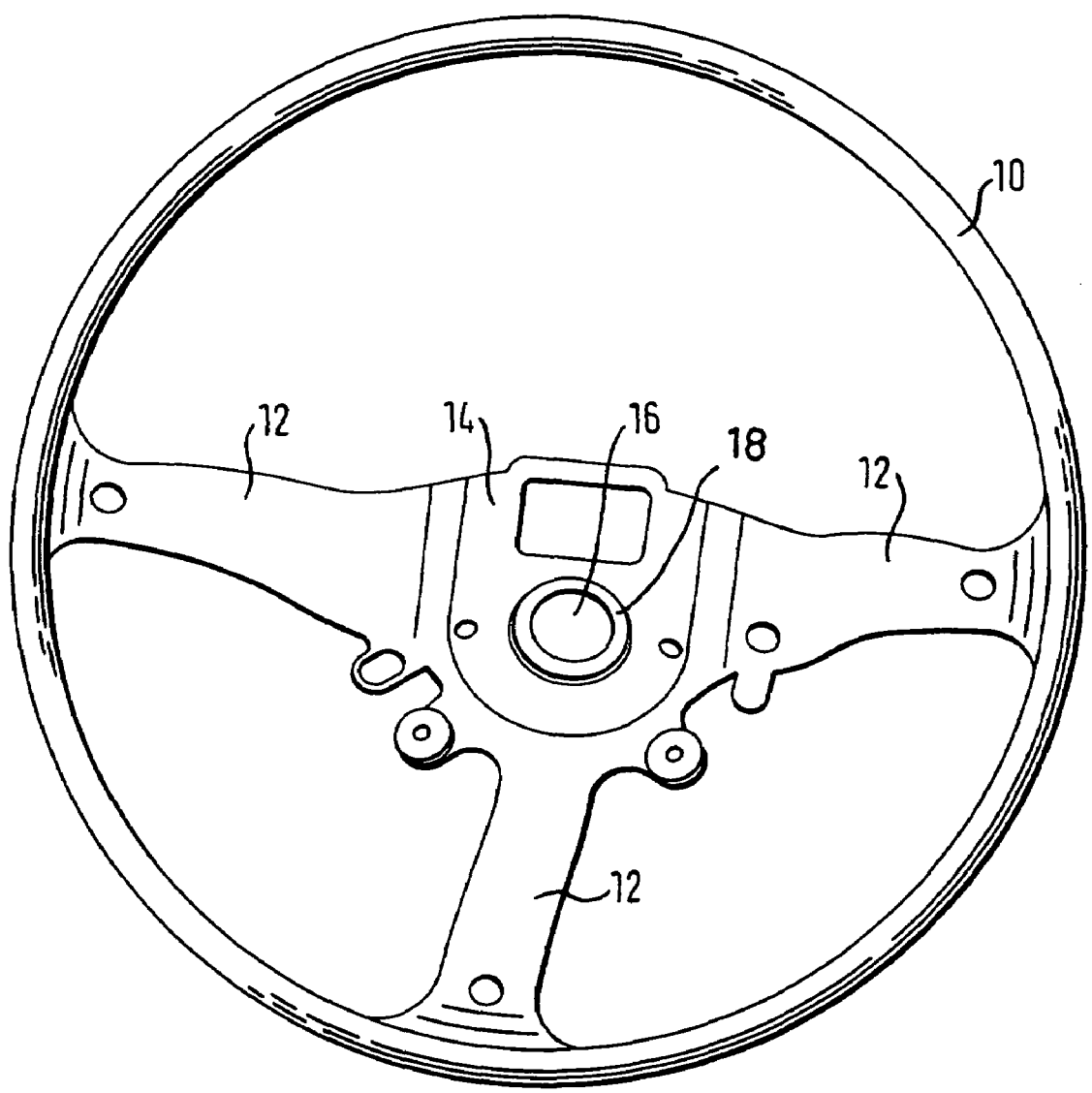

The invention relates to a vehicle steering wheel.

BACKGROUND OF THE INVENTION

Metal steering wheel skeletons are usually surrounded with foam, so that the skeleton is not visible. The skeleton must absorb high forces with the striking of the occupant during an accident. In order to reduce the impact intensity on impact, the skeleton must deform in a plastic manner. On the other hand, it must of course not be too soft. In particular, it must not break. In this connection, there is the so-called hub penetration test. In this, the bushes embedded in the die cast material are not to be driven out from the die cast material.

It is an object of the invention to provide a steering wheel with a steering wheel skeleton, which is deformed plastically in an accident and nevertheless shows a high stability in fact during the hub penetration test.

BRIEF SUMMARY OF THE INVENTION

The vehicle steering wheel according to the invention comprises a steering wheel skeleton having a hub section, which has a bush extending around a central insertion opening and at least one separate reinforcement plate connected with the bush which is embedded into a die cast section of the steering wheel skeleton. The bush has a groove directed radially outwards, into which an edge of a recess in the reinforcement plate projects. The reinforcement plate is arranged on the bush through a joint connection by material conjunction.

A joint connection by material conjunction is welding, soldering or glueing, the first two types of connection being preferred in the invention. The reinforcement plate or the reinforcement plates embedded into the die cast section bind the bush on the one hand better into the die cast material; on the other hand, the entire hub section becomes more stable. The reinforcement plate can deform plastically with high stress and absorb a majority of the introduced energy. The double connection, in axial direction, between the bush and the reinforcement plate (on the one hand the form fit via the groove, on the other hand the material conjunction) reliably prevent a detachment of the reinforcement plate from the bush.

An even better binding of the reinforcement plate into the die cast material can be achieved by the reinforcement plate being provided with openings through which die cast material passes.

The reinforcement plate preferably is arranged only in the hub section, which means that it does not extend into the region of the spokes. For this, other sheet metal inserts or the like can be provided.

According to the preferred embodiment, several reinforcement plates are provided, directed outwards laterally from the bush, the radially inner ends being fastened on the bush. This embodiment is intended to make possible an easier binding of the reinforcement plates into the groove of the bush.

In this connection, it is advantageous if the radially inner end of each reinforcement plate has a semicircular recess, by which the end projects laterally into the groove. The edge of the recess can be held by means of a press fit in the groove, preferably in any case without appreciable axial play, before the two parts are soldered or welded to each other.

The binding in of the bush into the die cast material can be further improved by the bush having at least one recess, into which die cast material penetrates and fills it. The recess is provided at the radial outer side of the bush. This increases the force which is necessary for driving out the bush from the die cast material.

This recess, which is intended to ensure a form fit between die cast material and bush in axial direction, is an annular groove in accordance with the preferred filling form.

BRIEF DESCRIPTION OF THE INVENTION

Figure 3:
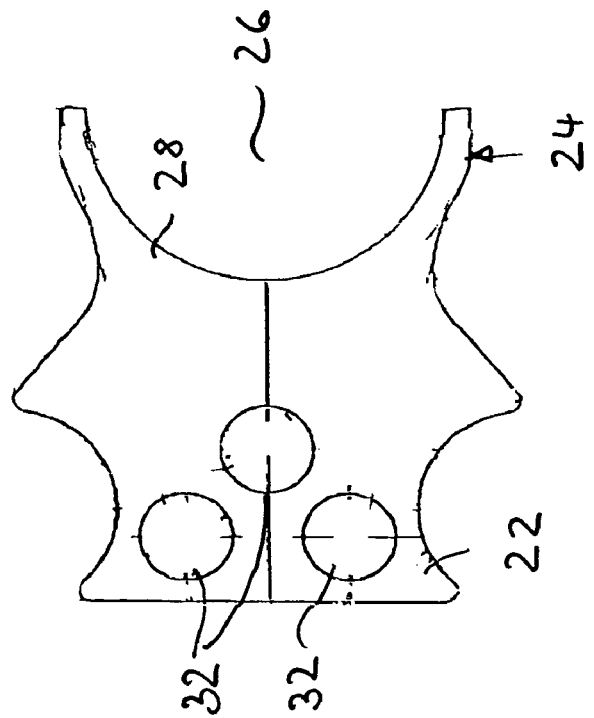
Figure 2:
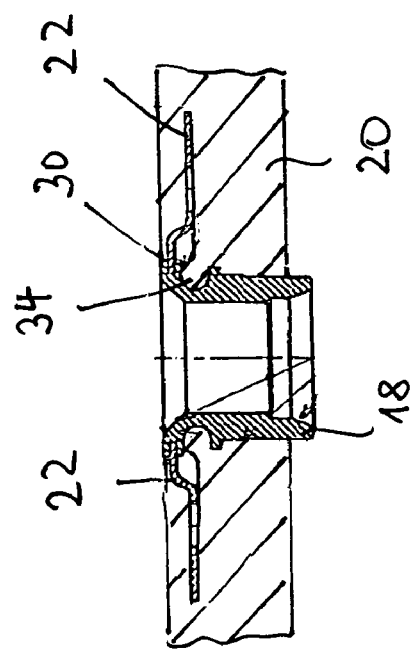

FIG. 1 shows a perspective view of a skeleton of the vehicle steering wheel according to the invention, FIG. 2 shows a sectional view through the steering wheel skeleton according to FIG. 1 in the region of the hub and FIG. 3 shows a top view of one of the two reinforcement plates used in the invention.

DETAILED DESCRIPTION OF A PREFERRED EMBODIMENT

In FIG. 1 a vehicle steering wheel, more precisely its skeleton, is illustrated, which has various sections, namely a steering wheel rim 10, spokes 12, and a hub section 14, from which the spokes 12 originate. The hub section 14 has a central insertion opening 16, to later receive a steering shaft. The skeleton consists largely of aluminium or magnesium die cast material; however, it has, moreover, some further parts which reinforce the die cast material.

In the hub section 14, a bush 18 is provided for this, which delimits laterally the central insertion opening 16.

Two reinforcement plates, lying diametrically opposed with respect to the insertion opening 16, are connected with the bush 18 of metal and, furthermore, are embedded in the die cast section 20 of the skeleton, as FIG. 2 shows. The reinforcement plates have reference number 22. One of the reinforcement plates 22 can be seen in FIG. 3, the second reinforcement plate only being constructed in mirror image hereto. The reinforcement plates have a radially inner end 24 with a semicircular recess 26 and an edge 28 delimiting the recess 26, which is inserted radially inwards into a peripheral groove 30 in the bush 18. The axial height of the groove 30 corresponds substantially to the thickness of the reinforcement plate 22 in the region of the edge 28.

Each reinforcement plate 22 is, furthermore, connected with the bush 18 in the region of the edge 28 and the groove 30 by welding or soldering, more generally by a material-combining joint connection.

In the region of the radially outer end, several openings 32 are provided in each reinforcement plate 22, through which die cast material extends.

Die cast material of the die cast section 20 also extends into a deep annular groove or recess 34, which is provided closely beneath the reinforcement plates 22 on the radial outer side, more precisely on the periphery of the bush 18.

The reinforcement plates 22 stabilize the hub section 14, i.e. do not project into spoke sections 12.

On an impact of the occupant onto the steering wheel in the region of the steering wheel rim 10, a substantially axial force is introduced into the hub section 14 via the spokes 12. This leads to the reinforcement plates 22 deforming plastically. The groove 30, which serves in axial direction as a form-fitting mounting for the reinforcement plates 22, relieves the weld- or solder connection.

Alternatively, of course, an adhesive connection could also be provided between the reinforcement plates 22 and the bush 18.

The reinforcement plates 22 are in fact connected with the bush 18, however they represent separate parts before the connection to the bush 18.

The invention claimed is:

1. A vehicle steering wheel, comprising:
   a steering wheel skeleton having a hub section (14), said hub section (14) including a die cast section (20), a central insertion opening (16) and a separate bush (18) around said central insertion opening (16), said bush (18) being coaxially arranged to said central insertion opening (16), said steering wheel skeleton further comprising spokes (12) originating from said hub section (14); and
   at least one separate reinforcement plate (22) which is connected with said bush (18) and is embedded into said die cast section (20), wherein said bush (18) has a groove (30) directed radially outwards, into which an edge (28) of a recess (26) in said reinforcement plate (22) projects and
   wherein said reinforcement plate (22) is mounted to said bush (18) by a joint connection by material conjunction.

2. The vehicle steering wheel according to claim 1, wherein said reinforcement plate (22) is provided with openings (32) for the passage of die cast material.

3. The vehicle steering wheel according to claim 1, wherein said reinforcement plate (22) does not extend into a region of said spokes (12).

4. The vehicle steering wheel according to claim 1, wherein several reinforcement plates (22) are provided which extend laterally outwards from said bush (18), radially inner ends (24) of said plates (22) are fastened to said bush (18).

5. The vehicle steering wheel according to claim 1, wherein a radially inner end (24) of each reinforcement plate (22) has a semicircular recess (26), with which said end (24) projects laterally into said groove (30).

6. The vehicle steering wheel according to claim 1, wherein said bush (18) has at least one recess (34) into which die cast material penetrates and substantially fills said recess (34), said recess (34) being provided at a radial outer side of said bush (18).

7. The vehicle steering wheel according to claim 6, wherein said recess (34) in said bush (18) is an annular groove.

\* \* \* \* \*

UNITED STATES PATENT AND TRADEMARK OFFICE
CERTIFICATE OF CORRECTION

PATENT NO. : 7,621,199 B2
APPLICATION NO. : 11/045415
DATED : November 24, 2009
INVENTOR(S) : Eck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Twenty-sixth Day of October, 2010

David J. Kappos
*Director of the United States Patent and Trademark Office*